US012585919B2

(12) United States Patent
Yu et al.

(10) Patent No.: US 12,585,919 B2
(45) Date of Patent: Mar. 24, 2026

(54) SYSTEMS AND METHODS FOR TEXT-TO-IMAGE GENERATION USING LANGUAGE MODELS

(71) Applicant: Salesforce, Inc., San Francisco, CA (US)

(72) Inventors: Ning Yu, Palo Alto, CA (US); Can Qin, Somervile, MA (US); Chen Xing, Palo Alto, CA (US); Shu Zhang, Fremont, CA (US); Stefano Ermon, Menlo Park, CA (US); Caiming Xiong, Menlo Park, CA (US); Ran Xu, Mountain View, CA (US)

(73) Assignee: Salesforce, Inc., San Francisco, CA (US)

( * ) Notice: Subject to any disclaimer, the term of this patent is extended or adjusted under 35 U.S.C. 154(b) by 476 days.

(21) Appl. No.: 18/162,535

(22) Filed: Jan. 31, 2023

(65) Prior Publication Data

US 2024/0185035 A1     Jun. 6, 2024

Related U.S. Application Data

(60) Provisional application No. 63/380,650, filed on Oct. 24, 2022.

(51) Int. Cl.
*G06N 3/0455*     (2023.01)
*G06T 5/70*     (2024.01)

(52) U.S. Cl.
CPC ............. *G06N 3/0455* (2023.01); *G06T 5/70* (2024.01); *G06T 2207/20084* (2013.01)

(58) Field of Classification Search
CPC .................... G06N 3/0455; G06T 5/70; G06T 2207/20084
See application file for complete search history.

(56) References Cited

PUBLICATIONS

Brian Davis et al, "Text and Style Conditioned GAN for Generation of Offline Handwriting Lines" arxiv.org 2009 (Year: 2009).*
Long et al, "Conditional Adversarial Domain Adaptation", arXiv:1705.10667v4 [cs.LG] Dec. 29, 2018, pp. 1-11.
Ganin et al, Domain-Adversarial Training of Neural Networks, Journey of Machine Learning Research, arXiv:1505.07818v4 [stat.ML] May 26, 2016, pp. 1-35.

* cited by examiner

*Primary Examiner* — Mark Roz
(74) *Attorney, Agent, or Firm* — Haynes and Boone, LLP

(57)     ABSTRACT
Embodiments described herein provide a mechanism for replacing existing text encoders in text-to-image generation models with more powerful pre-trained language models. Specifically, a translation network is trained to map features from the pre-trained language model output into the space of the target text encoder. The training preserves the rich structure of the pre-trained language model while allowing it to operate within the text-to-image generation model. The resulting modularized text-to-image model receives prompt and generates an image representing the features contained in the prompt.

20 Claims, 18 Drawing Sheets

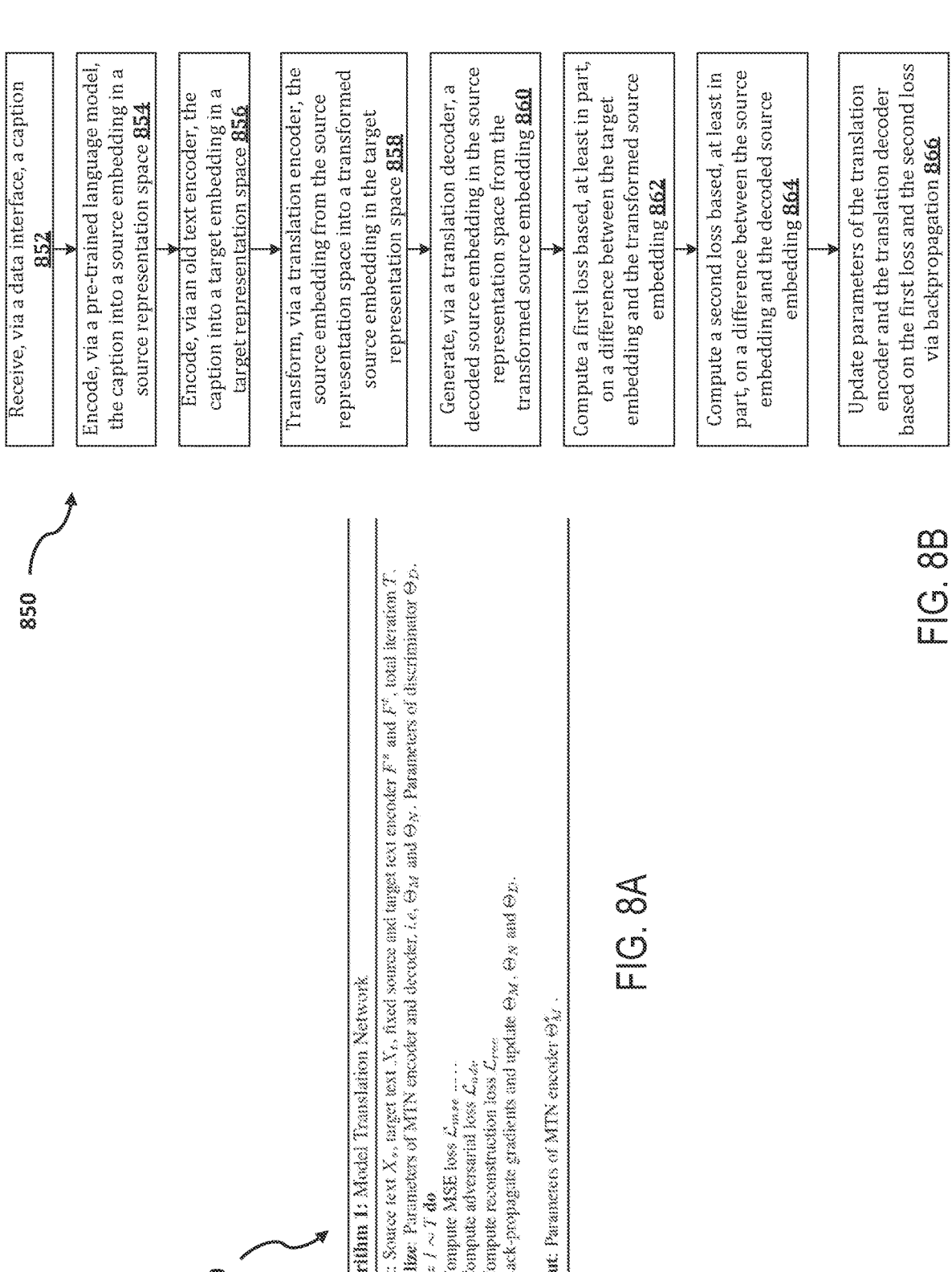

850

Receive, via a data interface, a caption 852

Encode, via a pre-trained language model, the caption into a source embedding in a source representation space 854

Encode, via an old text encoder, the caption into a target embedding in a target representation space 856

Transform, via a translation encoder, the source embedding from the source representation space into a transformed source embedding in the target representation space 858

Generate, via a translation decoder, a decoded source embedding in the source representation space from the transformed source embedding 860

Compute a first loss based, at least in part, on a difference between the target embedding and the transformed source embedding 862

Compute a second loss based, at least in part, on a difference between the source embedding and the decoded source embedding 864

Update parameters of the translation encoder and the translation decoder based on the first loss and the second loss via backpropagation 866

Algorithm 1: Model Translation Network.

Input: Source text $X_s$, target text $Y_t$, fixed source and target text encoder $F^s$ and $F^t$, total iteration $T$.

Initialise: Parameters of MTN encoder and decoder, i.e, $\Theta_M$ and $\Theta_N$. Parameters of discriminator $\Theta_D$.

1  for $t = 1 \sim T$ do

4      Compute MSE loss $\mathcal{L}_{mse}$ ___;

5      Compute adversarial loss $\mathcal{L}_{adv}$;

6      Compute reconstruction loss $\mathcal{L}_{recon}$;

7      Back-propagate gradients and update $\Theta_M$, $\Theta_N$ and $\Theta_D$.

8  end

9  Output: Parameters of MTN encoder $\Theta_M$.

FIG. 8A

Model configurations for our MTN. We introduce two configurations of MTN-3RMs and MTN-5RMs.

| Stage | Dimensions | Block | MTN-3RMs | MTN-5RMs |
|---|---|---|---|---|
| 2*Head Net | 77 | Token MLP | Linear, LN, σ<br>Linear, LN, σ<br>Linear, LN | Linear, LN, σ<br>Linear, LN, σ<br>Linear, LN |
|  | 1024 | Sequence MLP | Linear, LN, σ<br>Linear, LN, σ<br>Linear, LN | Linear, LN, σ<br>Linear, LN, σ<br>Linear, LN |
| 2*Body Net | 77 | Token MLP | [Linear, LN, σ<br>Linear, LN, σ<br>Linear, LN] ×3 | [Linear, LN, σ<br>Linear, LN, σ<br>Linear, LN] ×5 |
|  | 1024 | Sequence MLP | [Linear, LN, σ<br>Linear, LN, σ<br>Linear, LN] ×3 | [Linear, LN, σ<br>Linear, LN, σ<br>Linear, LN] ×5 |
| 2*Tail Net | 77 | Token MLP | Linear, LN, σ<br>Linear, LN, σ<br>Linear, LN | Linear, LN, σ<br>Linear, LN, σ<br>Linear, LN |
|  | 1280 | Sequence MLP | Linear, LN, σ<br>Linear, LN, σ<br>Linear, LN | Linear, LN, σ<br>Linear, LN, σ<br>Linear, LN |

FIG. 9

FID on COCO. * indicates our re-implemented results. ZS denotes zero-shot.

| Method | FID↓ | ZS |
|---|---|---|
| CogView (Ding et al. 2021) | 27.10 | ✗ |
| LAFITE (Zhou et al. 2021) | 26.94 | ✗ |
| GLIDE (Nichol et al. 2021) | 12.24 | ✗ |
| Make-A-Scene (Gafni et al. 2022) | 11.84 | ✗ |
| LDM (Rombach et al. 2022) | 12.63 | ✓ |
| LDM* | 13.55 | ✓ |
| T5+FT | 23.30 | ✓ |
| T5+MTN | 14.32 | ✓ |
| T5+MTN+FT | 12.05 | ✓ |

FIG. 10

Ablation study of TS+MTN+LDM over the 5K COCO subset

| Ablations | | | | s=1.5 | | s=5 | | s=7.5 | |
| loss-mse | loss-rec | loss-adv | Finetuning | CLIP↑ | FID↓ | CLIP↑ | FID↓ | CLIP↑ | FID↓ |
|---|---|---|---|---|---|---|---|---|---|
| X | X | X | X | 10.70 | 98.17 | 10.75 | 141.19 | 11.00 | 156.70 |
| X | X | X | ✓ | 18.98 | 35.76 | 22.05 | 49.14 | 22.49 | 53.11 |
| ✓ | X | X | X | 20.40 | 34.41 | 23.01 | 48.67 | 23.40 | 52.78 |
| ✓ | ✓ | X | X | 20.53 | 33.14 | 23.23 | 45.96 | 23.57 | 48.67 |
| ✓ | ✓ | ✓ | X | 20.67 | 32.80 | 23.24 | 45.48 | 23.74 | 48.51 |
| ✓ | ✓ | ✓ | ✓ | 21.14 | 30.93 | 23.88 | 41.92 | 24.17 | 44.58 |

FIG. 11

Analysis of learning rate of MTN in OpenClip → CLIP.

| CLIP↑ | lr=1e-3 | lr=1e-4 | lr=1e-5 | lr=1e-6 |
|-------|---------|---------|---------|---------|
| CLIP↑ | 27.27 | 29.53 | 27.17 | 19.40 |

FIG. 12

Analysis of Different Text Encoders over the 5K COCO subset.

| | Bert-B (110M) | | Roberta-L (355M) | | CLIP-Text (123M) | | T5-L (770M) | | T5-3B (2.8B) | |
|---|---|---|---|---|---|---|---|---|---|---|
| | CLIP↑ | FID↓ | CLIP↑ | FID↓ | CLIP↑ | FID↓ | CLIP↑ | FID↓ | CLIP↑ | FID↓ |
| s=1.5 | 19.42 | 37.46 | 20.03 | 34.06 | 19.02 | 38.93 | 19.78 | 35.17 | 20.67 | 32.80 |
| s=5 | 21.97 | 53.35 | 22.85 | 45.88 | 21.85 | 47.32 | 22.76 | 47.91 | 23.24 | 45.48 |
| s=7.5 | 22.68 | 53.21 | 23.25 | 48.96 | 22.38 | 49.66 | 23.23 | 50.02 | 23.74 | 48.51 |

FIG. 14

Model Transfer with variant token lengths (SrcTokenLength →TargetTokenLength) over the 5K COCO subset with the guidance as S. Roberta-L (Liu et al., 2019) is applied as the new text encoder to replace LDM text encoder.

| | 77→77 | 128→77 | 256→77 |
|---|---|---|---|
| CLIP↑ | 22.85 | 23.19 | 23.37 |
| FID↓ | 45.88 | 45.67 | 45.53 |

FIG. 15

Analysis of MTN's training cost.

| | Data Size | | |
|---|---|---|---|
| | 5M | 18M | 116M |
| CLIP↑ | 20.92 | 23.24 | 23.71 |
| FID↓ | 48.63 | 45.48 | 43.17 |
| GPU Days↓ | 1.67 | 5.89 | 41.20 |

FIG. 16

Analysis of Performance and Computation Cost

| | CLIP↑ | FID↓ | GPU Days↓ |
|---|---|---|---|
| LDM | 23.79 | 42.83 | - |
| T5 + FT | 23.29 | 45.62 | ~140 |
| T5 + MTN18M | 23.24 | 45.48 | 5.89 |
| T5 + MTN18M + FT | 23.88 | 41.92 | ~100 |
| T5 + MTN116M | 23.71 | 43.17 | 41.20 |
| T5 + MTN116M + FT | 24.14 | 41.53 | ~100 |

FIG. 17

Comparison with translation model, i.e., M2M100-418M (Fan et al., 2021), for multilingual generation. The Multilingual-CLIP↑ score over Crossmodal (Thapliyal et al., 2022) benchmark is reported here.

| | M2M100-418M+SDM | XLM-Roberta+MTN+SDM |
|---|---|---|
| Chinese | 24.50 | 22.01 |
| French | 25.08 | 23.09 |
| Spanish | 23.83 | 22.91 |
| Korean | 22.35 | 21.46 |
| Japanese | 23.73 | 23.99 |
| Ukrainian | 23.99 | 22.81 |
| Italian | 21.08 | 22.40 |

FIG. 18

SYSTEMS AND METHODS FOR TEXT-TO-IMAGE GENERATION USING LANGUAGE MODELS

CROSS REFERENCE(S)

The instant application is a nonprovisional of and claims priority under 35 U.S.C. 119 to U.S. provisional application No. 63/380,650, filed Oct. 24, 2022, which is hereby expressly incorporated by reference herein in its entirety.

TECHNICAL FIELD

The embodiments relate generally to natural language processing and machine learning systems, and more specifically to the use of pre-trained language models in text-to-image generation.

BACKGROUND

Machine learning systems have been widely used in text-to-image (T2I) generative models. The T2I models take as input a prompt (e.g., a sequence of words such as "a gray bunny jumping on a green slope," etc.) and generate an image depicting contents as reflected by the prompt. Existing T2I models often comprise a text encoder. The ability of such text encoders to understand and represent text is often a bottleneck within the T2I models. Text encoders in existing T2I models are often trained only on short image prompts, and their performance on complex prompts can be constrained by the quality of the features extracted by the text encoder. As a result, image outputs from existing T2I models often suffer from compromised quality, e.g., not faithful to the prompts, lacking compositional capabilities, etc. In addition, these existing T2I models often require the use of proper prompts to achieve plausible output images.

Therefore, there is a need for an improved system for text-to-image generation.

BRIEF DESCRIPTION OF THE DRAWINGS

FIG. 8A is pseudo-code segment suitable for implementing the training of the text-to-image generation framework, according to embodiments described herein.

FIG. 8B is a simplified logic flow diagram illustrating a method of training the text-to-image generation framework, according to embodiments described herein.

FIGS. 9-18 provides charts illustrating exemplary performance of different embodiments described herein.

Figure 1:
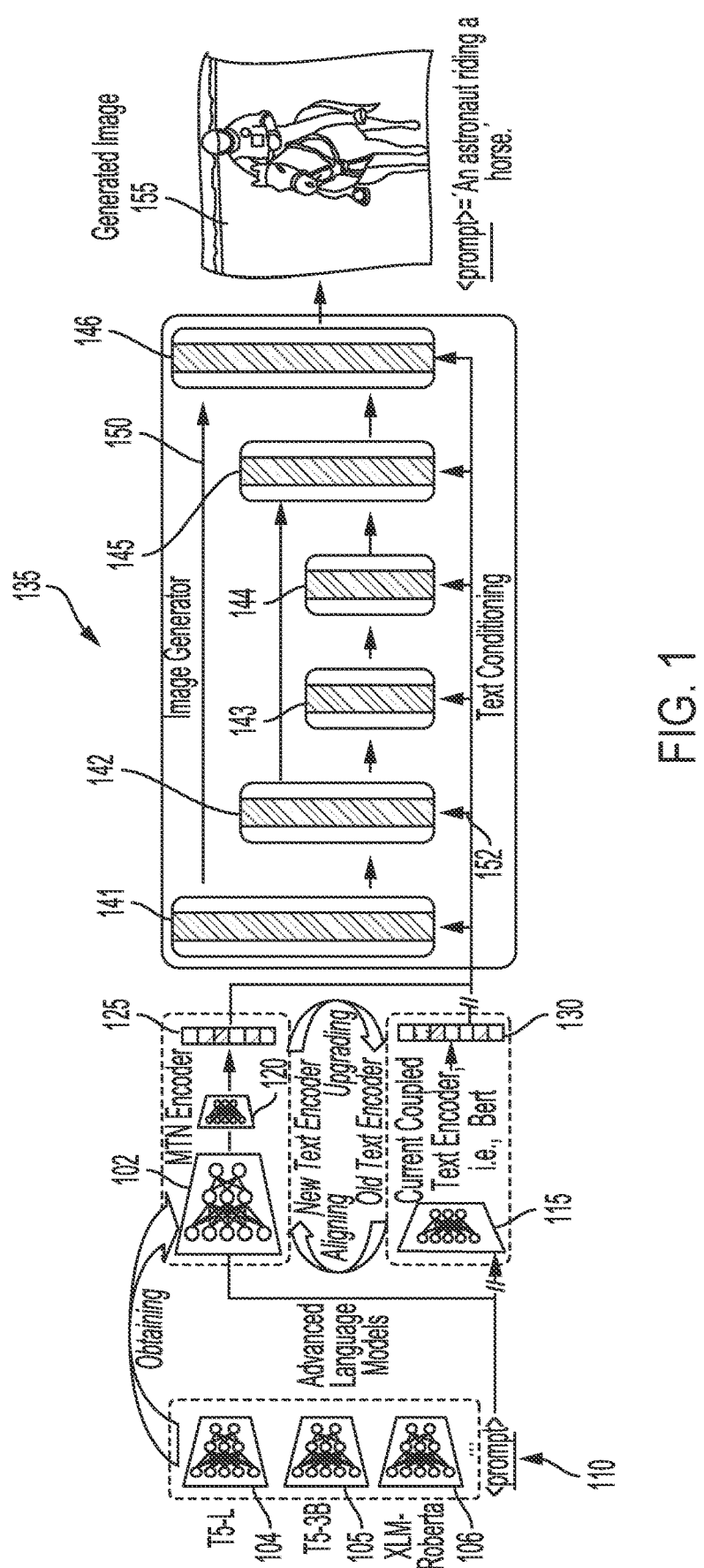
FIG. 1 is a simplified diagram illustrating a text-to-image generation framework, according to some embodiments.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Traditionally, a text encoder is typically used in a text-to-image ("T2I") model to map input textual prompts to a feature vector in a representation space. However, the ability of such text encoders to understand and represent text is often a bottleneck within the T2I models. Text encoders in existing T2I models are often trained only on short image prompts, and their performance on complex prompts can be constrained by the quality of the features extracted by the text encoder. Replacing the text encoder in a text-to-image model is challenging and often requires retraining the model.

In view of the need for a more efficient and accurate text-to-image framework, embodiments described herein provide a network architecture that employs a pre-trained language model as a text encoder within the T2I model. Specifically, a pre-trained language model is aligned with the text encoder of an existing T2I model, such that the pre-trained language model replaces the text encoder of the existing T2I model. In particular, after the alignment between the pre-trained language model and the text encoder of the existing T2I model, the resulting T2I model, (referred to as the modularized T2I model ("M-T2I")) built upon the pre-trained language model acting as a text encoder and the original image coder, is ready to use without retraining.

Embodiments described herein provide a number of benefits. For example, a monolingual T2I model can be aligned to a multilingual pre-trained language model, such that prompts fed to the modularized T2I model can be in multiple languages and generate an image corresponding to the prompt. In addition, the modularized T2I model is superior to baseline models with respect to image quality and language controllability.

Specifically, as further detailed in relation to FIG. 1, an off-the-shelf pre-trained (large) language model can be engaged as the text encoder in the T2I framework such that only a relatively small translation network encoder and decoder need to be finetuned during training while the large language model remains frozen. In this way, the computational efficiency of training is largely improved.

Overview

FIG. 1 is a simplified diagram illustrating a modularized text-to-image ("M-T2I") framework according to some embodiments described herein. The M-T2I framework comprises a pre-trained language model (LM) 102, a Model Translation Network ("MTN") encoder 120, and an image generator 135.

In some embodiments, the M-T2I framework may be viewed as built upon an existing T2I model by replacing the existing text encoder (also referred to as a "target text encoder") 115 of the existing T2I model by the pre-trained language model ("LM") 102 and the MTN encoder 120. The MTN encoder 120 transforms the output from the LM 102 into the same space as the output from the target text encoder 115 such that the resulting transformed source embeddings 125 are aligned with target embeddings 130 generated by the target text encoder 115.

In one embodiment, the LM 102 may be any off-the-shelf pre-trained language models such as, but not limited to, T5-L 104, T5-3B 105, or XLM-Roberta 106. LM 102 receives input in the form of a prompt 110. The LM 102 generates a source embedding that is in a source embedding space, which may be different than the target representation space of the target text encoder 115. The MTN encoder (also referred to as the "translation network encoder") 120 receives the source embedding as input, and transforms it into a transformed source embedding 125 in the target representation space of the target text encoder 115 to align with the target embedding 130 that is generated by the target text encoder 115. Thus the output from the LM 102, via the translation network encoder 120, can be used as input to the image generator 135 of the M-T2I model.

The image generator 135 is comprised of a neural network that includes a series of layers 141-146 with text conditioning 152. For example, the transformed source embedding 125 may be used as text conditioning 152 by the image generator 135 to generate output images. In some instances, the image generator 135 may include skip connections 150 between the layers 141-146. The final output of the image generator is an image 155 associated with the prompt 110, e.g., "an astronaut riding a horse."

It is to be noted that the six layers 141-146 in the image generator 135 are for illustrative purpose only, and any other number of layers (e.g., five, seven, eight, etc.) may be employed in the image generator 135. It should also be appreciated that the skip connection 150 is for illustrative purpose only, and any other number of skip connections (e.g. two, three, four, etc.) may be employed in the image generator 135.

Figure 2:
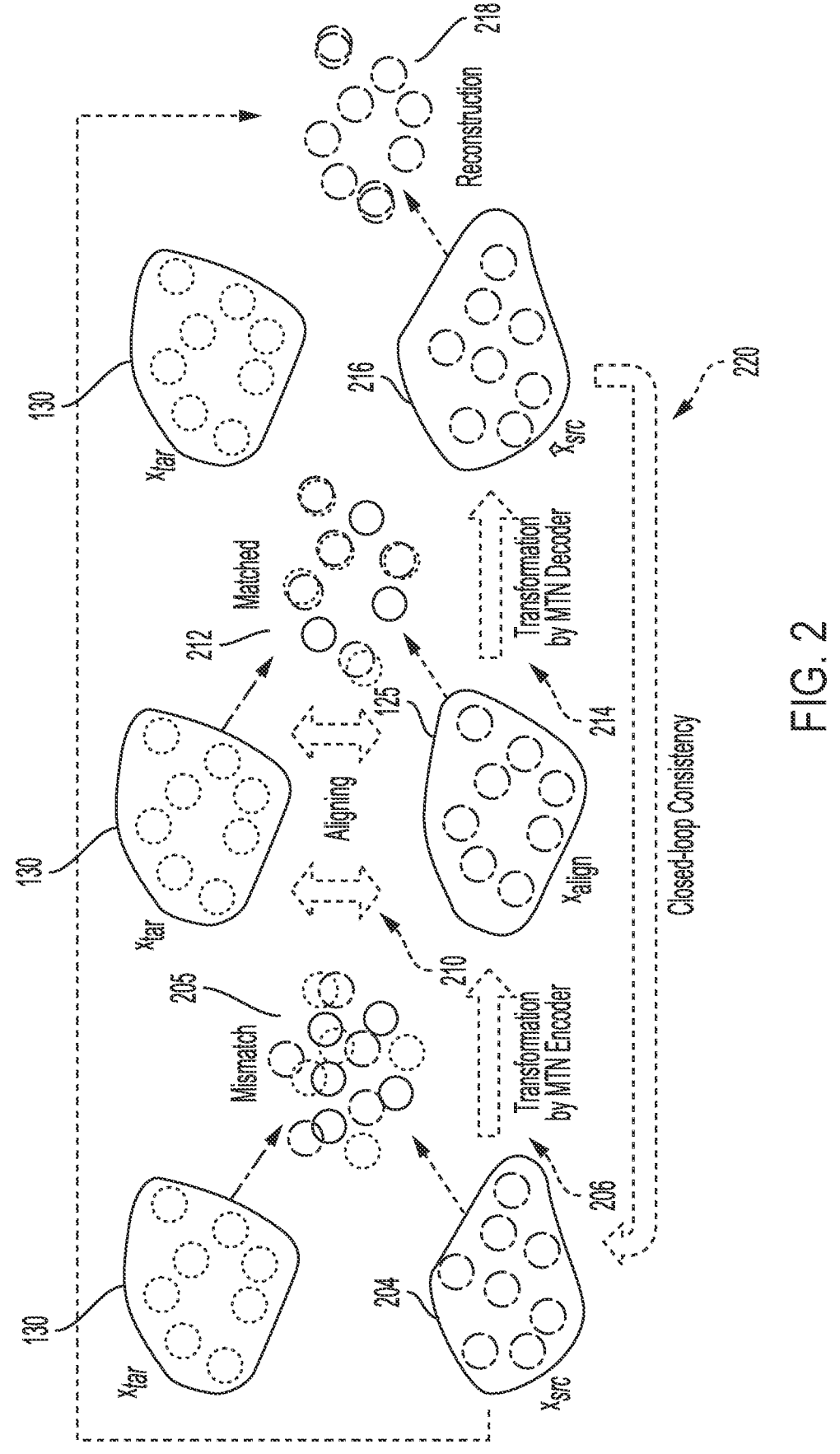
FIG. 2 is a simplified diagram illustrating element-wise training for a text-to-image generation framework, according to embodiments described herein.

FIG. 2 is a simplified diagram illustrating example aspects of element-wise training for the text-to-image generation framework described in FIG. 1, according to embodiments described herein. Specifically, the trained translation network encoder 120 is configured to translate the LM output into the target embedding space of the target text encoder while at the same time preserving the rich, feature discriminating qualities of the LM.

The LM 102, $F^s$, and the target text encoder 115, $F^t$, map prompts 110 into source embeddings 204, and target embeddings 130, respectively. Due to the different models there is a mismatch 205 between the target and source features. The translation network is an autoencoder whose encoder 120 produces an encoding transformation 206 of the source embedding 204 into the target representation space of the target text encoder 115. This allows alignment 210 between the target embedding 130 and the transformed source embedding 125, yielding matched embeddings 212 for the same prompt 110. The translation network enables the image generator to understand the new text features coming from the LM 102 without finetuning. The translation network's decoder produced a decoding transformation 214 of the transformed source embedding 125, producing a decoded source embedding 216, which may be compared with the source embedding to ensure reconstruction 218. This facilitates a closed loop consistency 220 within the translation network ensuring feature discrimination is preserved.

Figure 3:
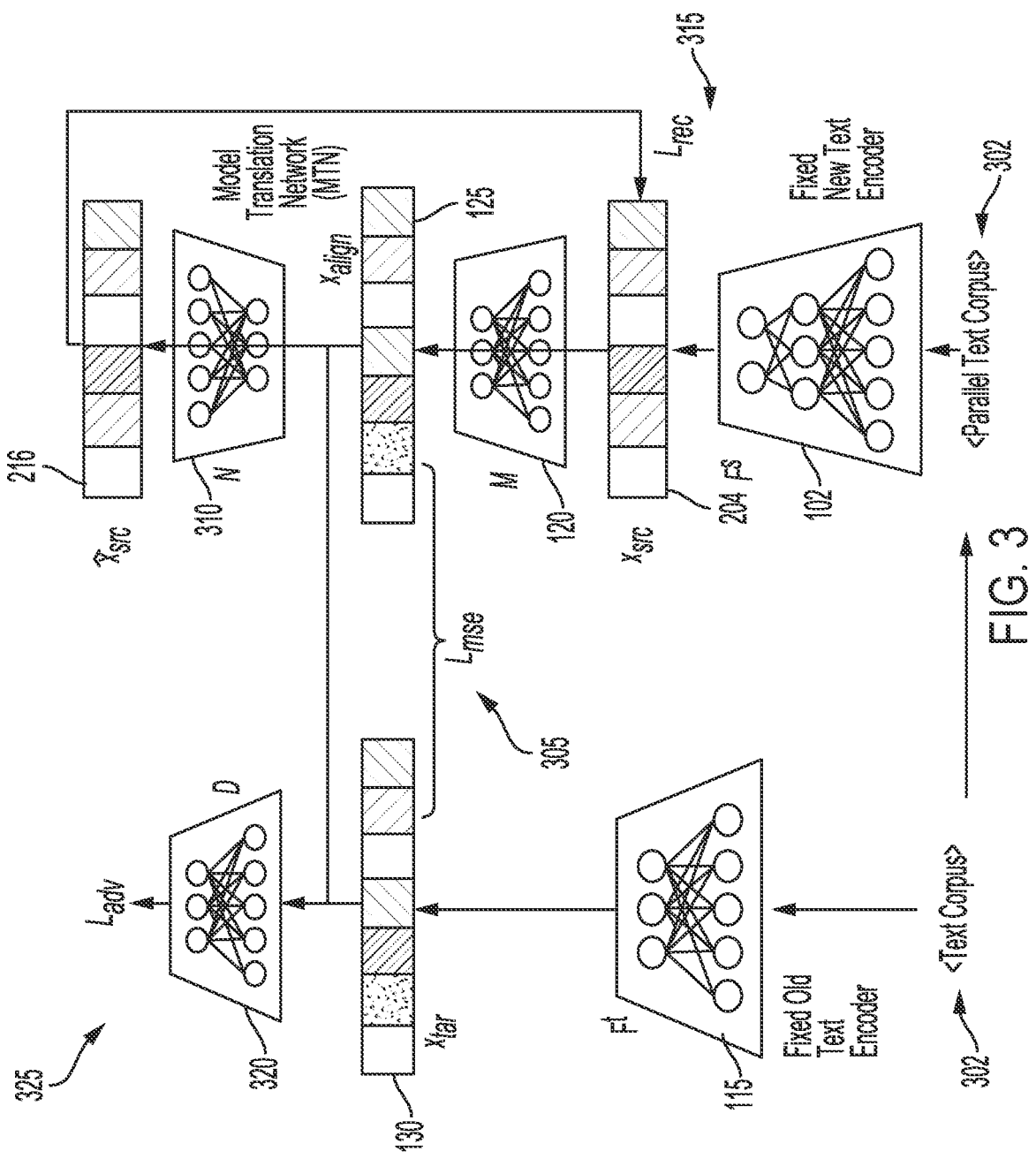
FIG. 3 is a simplified diagram illustrating training for a text-to-image generation framework, according to embodiments described herein.

FIG. 3 is a simplified diagram illustrating example aspects of training for the text-to-image generation framework shown in FIG. 1, according to embodiments described herein. In some instances, in addition to the element-wise training described in FIG. 2 and associated description, distribution-wise training is done to align the distribution over the target representation space from the target text encoder 115 and the LM 102 transformed by the translation network encoder 120.

Given a text corpus 302, $X=\{x_{ij}|i=1, \ldots, M, j=1, \ldots, N\}$, where M is the length of tokens and N is the total quantity of elements in the corpus, the LM 102, $F^s$, and the target text encoder 115, $F^t$, map raw text data (e.g., prompt 110) into the set of source embeddings of the corpus, $S=\{s_{ij}|i=1, \ldots, M_s, j=1, \ldots, N\}$, where $s_{ij}=F^s(x_{ij})\in R^{d_s}$ and the set of target embeddings of the corpus, $T=\{t_{ij}|i=1, \ldots, M_t, j=1, \ldots, N\}$, where $t_{ij}=F^t(x_{ij})\in R^{d_t}$, respectively. The length of the source embeddings and the target embeddings are $M_s$ and $M_t$, respectively. Because the LM 102 and the target text encoder 115 are different models, there is severe distribution mismatch between the source and target features. The translation network is an autoencoder whose encoder 120, denoted by $M(\bullet, \Theta_M)$, where $\Theta_M$ are the parameters of the encoder, learns to map the new text features from the LM 102, i.e., $s\in S$, to align with the text features of the target text encoder, i.e., $t\in T$, where $p(M(s, \Theta_M))\approx p(t)$. Therefore, the translation (i.e., $$F^s \xrightarrow{\Theta_M} F^t$$

) enables the image generator 135 to understand the new text features coming from the LM 102 without finetuning. During training, both element-wise and distribution-wise alignment losses are computed, which may include computing a mean square error, $\mathcal{L}_{mse}$ 305, and an adversarial loss, $\mathcal{L}_{adv}$ 325, which is measured over a discriminator network 320, denoted by $D(\bullet, \Theta_D)$, where $\Theta_D$ are the parameters of the discriminator network. The losses are given by the following equations:

$$\mathcal{L}_{mse}(\Theta_M):=E_{x_t\sim X_t, x_s\sim X_s}[\|F^t(x_t)-M(F^s(x_s),\Theta_M)\|_2^2] \tag{1}$$

$$\mathcal{L}_{adv}(\Theta_M,\Theta_D):=E_{x_t\sim X_t}[\log D(F^t(x_t),\Theta_D)]+E_{x_s\sim X_s}[\log 1-D(M(F^s(x_s),\Theta_M),\Theta_D)] \tag{2}$$

where $X_s$ and $X_t$ denote the source and target inputs, respectively, and they can be the same prompts in English or in bilingual but parallel content for multilingual text-to-image generation. The source and target input are inputs for the LM 102 and the target text encoder 115, respectively.

To project the rich semantics necessary for model upgrading, a decoder network 310, denoted by $N(\bullet, \Theta_N)$, where $\Theta_N$ are the parameters of the translation network decoder 310, is applied for feature reconstruction. The associated reconstruction loss 315 is given by:

$$\mathcal{L}_{rec}(\Theta_M,\Theta_N):=E_{x_s\sim X_s}[\|x_s-N(M(F^s(x_s),\Theta_M),\Theta_N)\|_2^2] \tag{3}$$

Summing the losses produces a total loss. The gradients of the total loss are used to update the parameters of the networks via backpropagation. The total loss can be formalized as:

$$\mathcal{L}_{total}= \mathcal{L}_{mse}+ \mathcal{L}_{adv}+ \mathcal{L}_{rec.} \tag{4}$$

In some instances, only the reconstruction and the mean square error loss may be used to update the parameters of the network.

Figure 4:
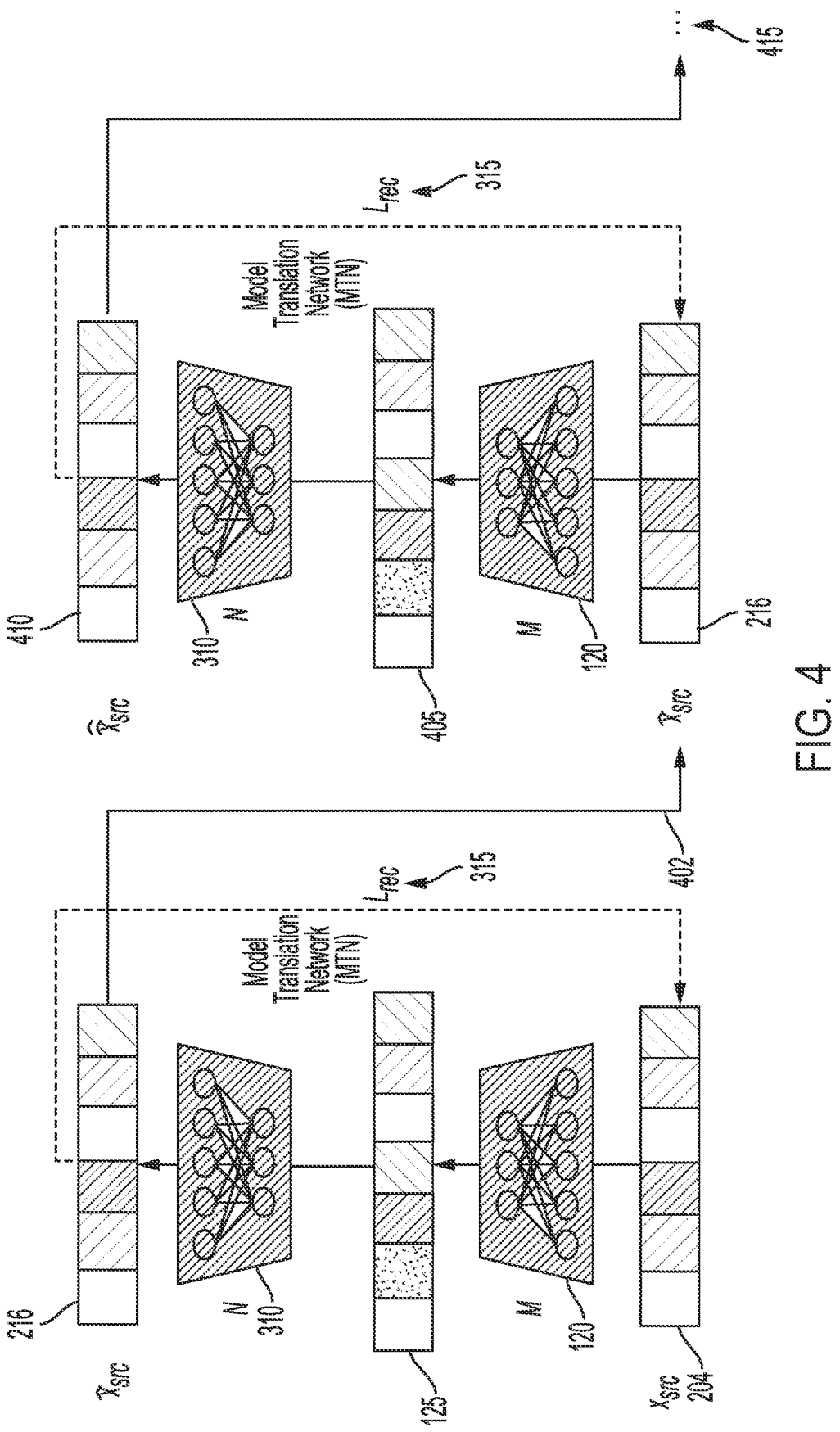
FIG. 4 is a simplified diagram illustrating reconstruction training within a text-to-image generation framework, according to embodiments described herein.

FIG. 4 is a simplified diagram illustrating example aspects of reconstruction training using the reconstruction loss 315 shown in FIG. 3 within a text-to-image generation framework, according to embodiments described herein. Specifically, the translation network comprised of the encoder 120 and decoder 310, should be stable such that the input 204 should be almost equivalent to the output 216.

Similarly, by inputting the output 216 back into the translation network, the translation network should produce a second output $\hat{\hat{x}}_{src}$ 410 approximately equal to $\hat{x}_{src}$ 216 and $x_{src}$ 204. The degree of the closed loop consistency can be check for further iterations 415 of autoencoding by the translation network. Ensuring closed loop consistency assists in accelerating training the translation network. Formalizing into an equation, closed loop consistency ensures:

$$x_{src}\approx\hat{x}_{src}\approx\hat{\hat{x}}_{src} \tag{5}$$

Figure 5:
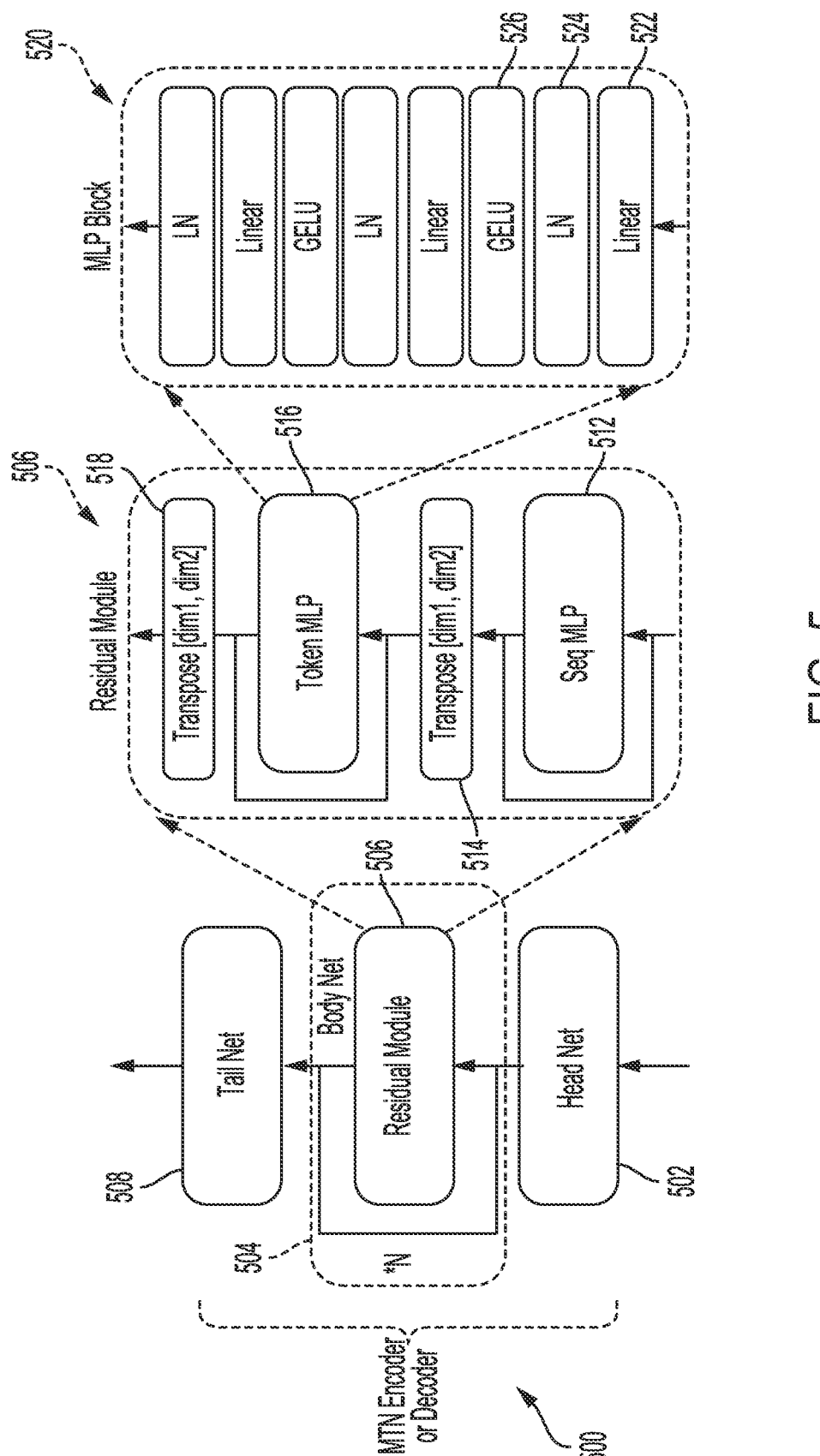
FIG. 5 is a simplified diagram of the structure of a translation network encoder and decoder, according to embodiments described herein.

FIG. 5 a simplified diagram of the structure of a translation network 500, according to embodiments described herein.

The translation network encoder/decoder 120/310 stacks three subnets in sequence: a head net 502, a body net 504, which may be comprised of multiple residual modules 506, and a tail net 508. The head net 502 is only used for simple feature transformation. The body net 504 has multiples residual modules 506 for fine-grained representation learning. In some instances, the tail 508 net converts the dimension of the output from the body net 504 into the dimension matching the target representation space.

Each residual module 506 may be comprised by multilayer perceptron (MLP) based mixer blocks. In some instances, the MLP-based mixer block is used in a Sequence Mixer 512 and a Token Mixer 516 with the necessary transpositions 514, 518 to match target dimensions of the next block or other component of the network. The Sequence Mixer 512 may be designed to learn the same channel in sequential tokens. The Token Mixer may learn the representation of each token using shared MLPs. An MLP-based mixer block 520 may include a series of layers, comprised of various ordering and numbers of Linear layers 522, Layer Normalization layers 524, and non-linear function layers 526 (e.g., GELU).

The input data to alignment can be represented as a sequence of tokens: $X_{i,*}=\{x_{i,1}, x_{i,2}, \ldots, x_{i,S}\}$, where $X_{i,*}\in\chi$ and $x_{i,j}\in R^C$, with sequence length S and token dimension C. In some instances, $\chi$ is the text corpus in the source representation space. The transformations performed by the Sequence Mixer 512 and Token Mixer 516 may be formalized in the following equations:

$$U_{*,i}=X_{*,i}+W_2\sigma(W_1*LN_{\gamma1,\beta1}(X)_{*,i}),i=1, \ldots ,C \tag{6}$$

$$X_{j,*}=X_{j,*}+W_4\sigma(W_3*LN_{\gamma2,\beta2}(U)_{j,*}),j=1, \ldots ,S \tag{7}$$

where $X_{*,*}$ is the feature generated from the pre-trained language model, $U_{*,*}$ is the output of Seq MLP 512, $LN_{\gamma,\beta}$ denotes layer normalization (e.g., 524 in FIG. 5) parametrized by $\gamma$ and $\beta$, $\sigma$ indicates the non-linear operator such as GELU (e.g., 526 in FIG. 5), and $W_1, \ldots, W_4$ are weight matrices of the MLP mixers.

To generate an image using a text-to-image model, an image generator must be trained. In some instances, the image model used is Latent Diffusion (LDM) or one of its extensions, such as Stable Diffusion (SDM). The LDM comprises two components. First, an autoencoder pretrained by enormous images that have been regularized using either the KL-divergence or vector quantization. The encoder portion, denoted E(•), of the autoencoder transforms an image into a latent space. The decoder element of the autoencoder transforms elements of the latent space back into the image space (e.g. pixel space). The second component is a diffusion model, trained in the latent space. The diffusion model uses the denoising loss and U-net for its structure. To facilitate image generation, LDM applies one or more conditional signals, y, such as text, mask, or layout to the image decoder by injecting into the U-net, making use of cross-attentional layers. An LDM loss can be computed based on the following equation:

$$\mathcal{L}_{LDM} :=E_{z-E(x),\epsilon-N(0,1),t,y}[\||-\epsilon_\theta(z_t,t,c_\phi(y))\||], \tag{8}$$

where t represents the time step in the noising process, z t is the noise corrupted latent tensor at time step t, $z_0$=E(x), $\epsilon$ is the unscaled Gaussian noise, $c_\phi$ is the conditioning network parametrized by $\phi$, N(0,1) is the standard Gaussian distribution of mean zero and variance one, and $\epsilon_\theta$ is the denoising network (e.g., a U-net)). At inference, clean images can be generated via a classifier-free guidance as:

$$\hat{\epsilon}(z_t|y)=\epsilon_\theta(z_t)+s\bullet(\epsilon_\theta(z_t,c_\phi(y))-\epsilon_\theta(z_t)), \tag{9}$$

where s is the guidance weight to balance text controllability and image fidelity. In some instances, this training procedure may be used to finetune the already trained image generator.

Computer and Network Environment

Figure 6:
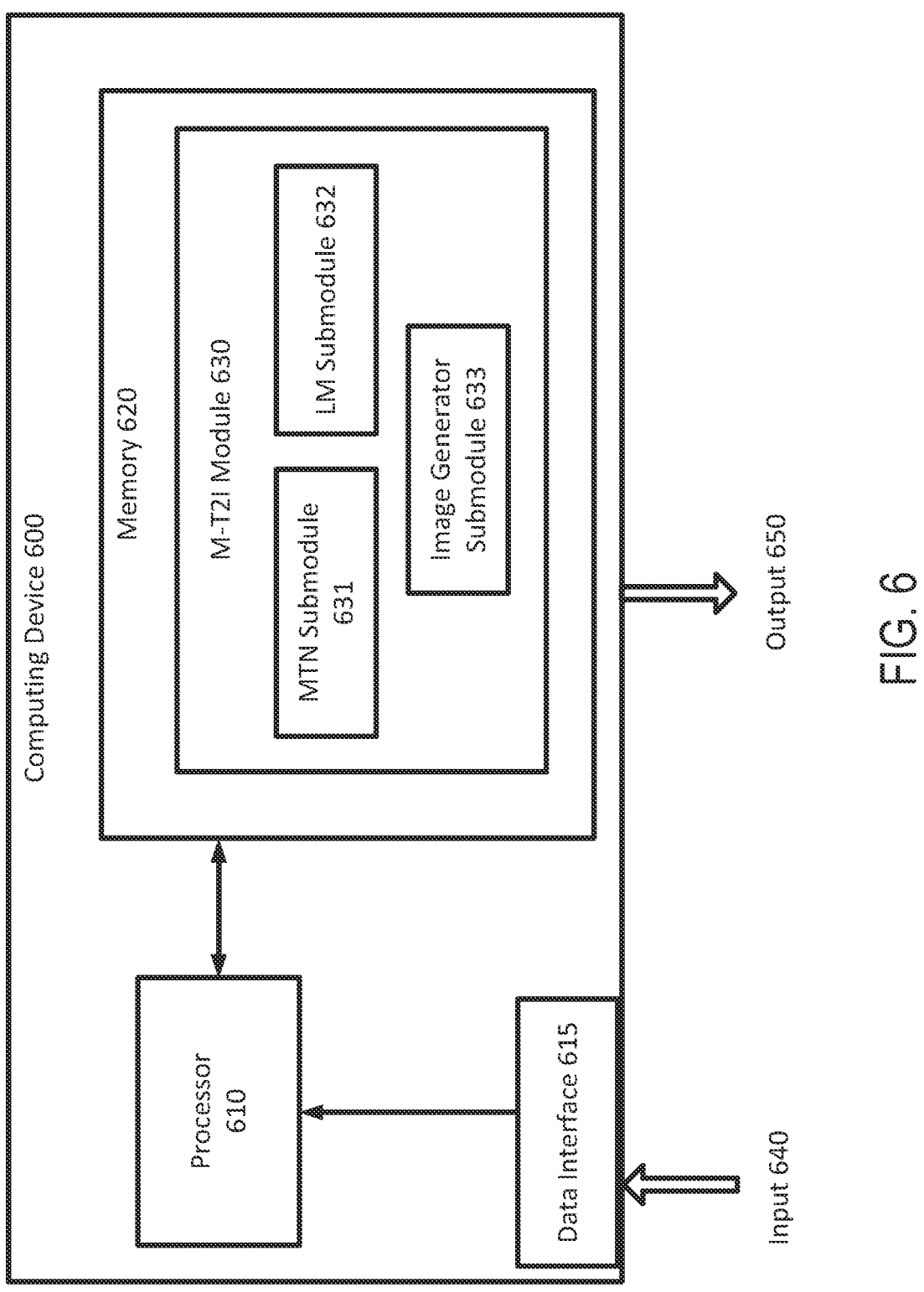
FIG. 6 is a simplified diagram illustrating a computing device implementing the text-to-image generation framework described in FIGS. 1-5, according to one embodiment described herein.

FIG. 6 is a simplified diagram illustrating a computing device implementing the modularized text-to-image (M-T2I) framework described in FIGS. 1-5 and detailed description, according to one embodiment described herein. As shown in FIG. 6, computing device 600 includes a processor 610 coupled to memory 620. Operation of computing device 600 is controlled by processor 610. And although computing device 600 is shown with only one processor 610, it is understood that processor 610 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 600. Computing device 600 may be implemented as a stand-alone subsystem, as a board added to a computing device, and/or as a virtual machine.

Memory 620 may be used to store software executed by computing device 600 and/or one or more data structures used during operation of computing device 600. Memory 620 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/ or any other medium from which a processor or computer is adapted to read.

Processor 610 and/or memory 620 may be arranged in any suitable physical arrangement. In some embodiments, processor 610 and/or memory 620 may be implemented on a same board, in a same package (e.g., system-in-package), on a same chip (e.g., system-on-chip), and/or the like. In some embodiments, processor 610 and/or memory 620 may include distributed, virtualized, and/or containerized computing resources. Consistent with such embodiments, processor 610 and/or memory 620 may be located in one or more data centers and/or cloud computing facilities.

In some examples, memory 620 may include non-transitory, tangible, machine readable media that includes executable code that when run by one or more processors (e.g., processor 610) may cause the one or more processors to perform the methods described in further detail herein. For example, as shown, memory 620 includes instructions for M-T2I module 630 that may be used to implement and/or emulate the systems and models, and/or to implement any of the methods described further herein. M-T2I module 630 may receive input 640 such as an input training data (e.g., text prompts/captions) via the data interface 615 and generate an output 650 which may be an image associated with the prompt. Examples of the input data may include user-generated text queries. Examples of the output data may include images associated with the user-generated queries.

The data interface 615 may comprise a communication interface, a user interface (such as a voice input interface, a graphical user interface, and/or the like). For example, the computing device 600 may receive the input 640 (such as a training dataset) from a networked database via a communication interface. Or the computing device 600 may receive the input 640, such as text prompts or queries from a user via the user interface.

In some embodiments, the M-T2I module 630 is configured to generate an image based on an inputted prompt. The M-T2I module 630 may further include MTN submodule 631 (e.g., similar to MTN encoder 120 in FIG. 1), LM submodule 632 (e.g., similar to pre-trained language model 102 in FIG. 1), and Image Generator submodule (e.g., the existing T2I model).

In one embodiment, the M-T2I module 630 and its submodules 631, 632, 633 may be implemented by hardware, software and/or a combination thereof.

In one embodiment, the M-T2I module 630 and one or more of its submodules 631, 632, 633 may be implemented via an artificial neural network. The neural network comprises a computing system that is built on a collection of connected units or nodes, referred as neurons. Each neuron receives an input signal and then generates an output by a non-linear transformation of the input signal. Neurons are often connected by edges, and an adjustable weight is often associated to the edge. The neurons are often aggregated into layers such that different layers may perform different transformations on the respective input and output transformed input data onto the next layer. Therefore, the neural network may be stored at memory 620 as a structure of layers of neurons, and parameters describing the non-linear transformation at each neuron and the weights associated with edges connecting the neurons. An example neural network may be multilayer perceptron, and/or the like.

In one embodiment, the neural network based M-T2I module 630 and one or more of its submodules 631, 632, 633 may be trained by updating the underlying parameters of the neural network based on the loss described in relation to FIG. 3. For example, the loss described in Eq. (4) is a metric that evaluates how far away a neural network model generates a predicted output value from its target output value (also referred to as the "ground-truth" value). Given the loss computed according to Eq. (4), the negative gradient of the loss function is computed with respect to each weight of each layer individually. Such negative gradient is computed one layer at a time, iteratively backward from the last layer to the input layer of the neural network. Parameters of the neural network are updated backwardly from the last layer to the input layer (backpropagating) based on the computed negative gradient to minimize the loss. The backpropagation from the last layer to the input layer may be conducted for a number of training samples in a number of training epochs. In this way, parameters of the neural network may be updated in a direction to result in a lesser or minimized loss, indicating the neural network has been trained to generate a predicted output value closer to the target output value.

Some examples of computing devices, such as computing device 600 may include non-transitory, tangible, machine readable media that include executable code that when run by one or more processors (e.g., processor 610) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 7:
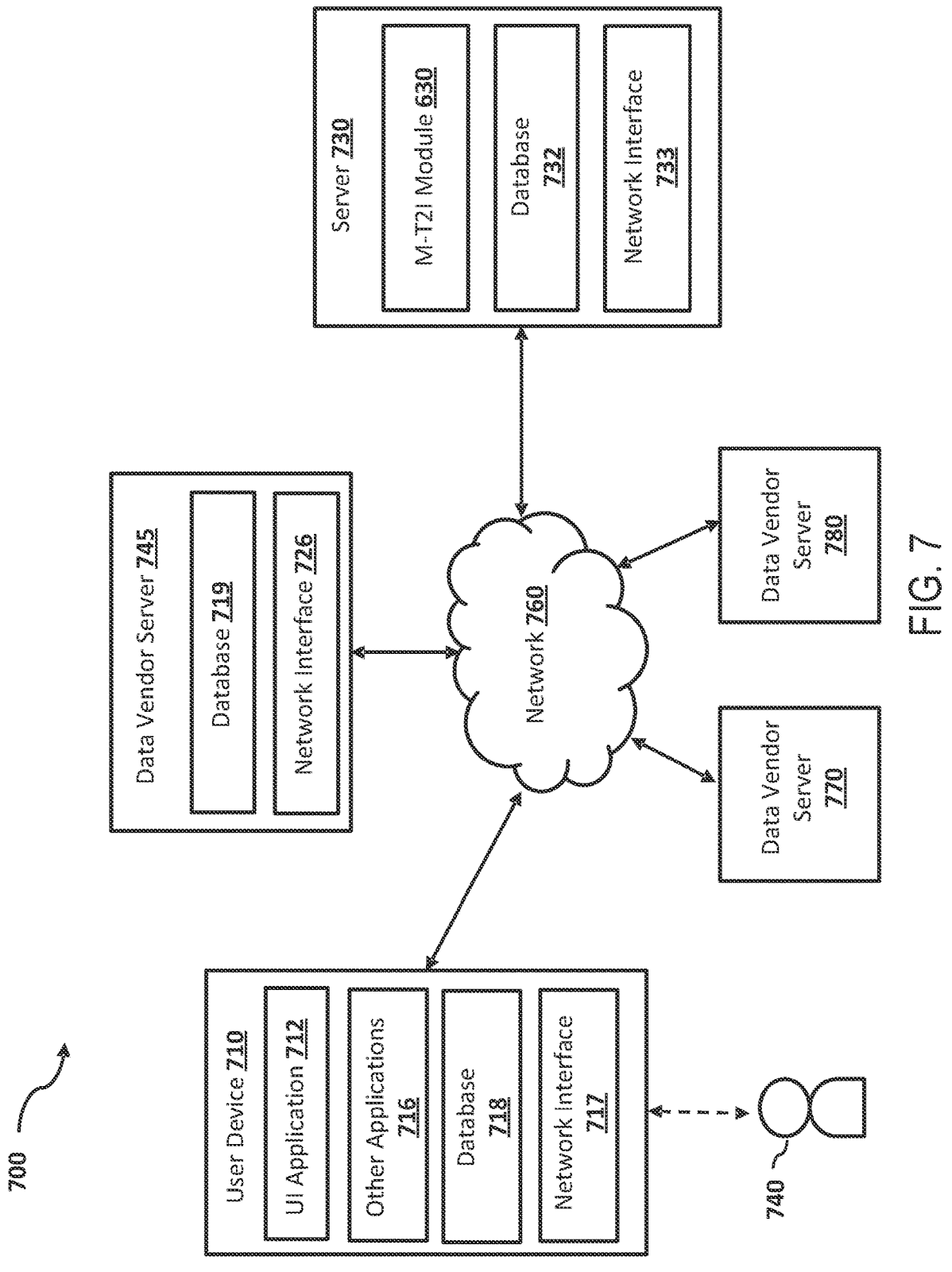
FIG. 7 is a simplified block diagram of a networked system suitable for implementing the text-to-image generation framework described in FIGS. 1-5 and other embodiments described herein.

FIG. 7 is a simplified block diagram of a networked system 700 suitable for implementing the M-T2I framework described in FIGS. 1-5 and other embodiments described herein. In one embodiment, system 700 includes the user device 710 which may be operated by user 740, data vendor servers 745, 770 and 780, server 730, and other forms of devices, servers, and/or software components that operate to perform various methodologies in accordance with the described embodiments. Exemplary devices and servers may include device, stand-alone, and enterprise-class servers which may be similar to the computing device 600 described in FIG. 6, operating an OS such as a MICROSOFT® OS, a UNIX® OS, a LINUX® OS, or other suitable device and/or server-based OS. It can be appreciated that the devices and/or servers illustrated in FIG. 7 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 710, data vendor servers 745, 770 and 780, and the server 730 may communicate with each other over a network 760. User device 710 may be utilized by a user 740 (e.g., a driver, a system admin, etc.) to access the various features available for user device 710, which may include processes and/or applications associated with the server 730 to receive an output data anomaly report.

User device 710, data vendor server 745, and the server 730 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 700, and/or accessible over network 760.

User device 710 may be implemented as a communication device that may utilize appropriate hardware and software configured for wired and/or wireless communication with data vendor server 745 and/or the server 730. For example, in one embodiment, user device 710 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 710 of FIG. 7 contains a user interface (UI) application 712, and/or other applications 716, which may correspond to executable processes, procedures, and/or applications with associated hardware. For example, the user device 710 may receive a message indicating an image has been generated from the server 730 and display the message via the UI application 712. In other embodiments, user device 710 may include additional or different modules having specialized hardware and/or software as required.

In various embodiments, user device 710 includes other applications 716 as may be desired in particular embodiments to provide features to user device 710. For example, other applications 716 may include security applications for implementing client-side security features, programmatic client applications for interfacing with appropriate application programming interfaces (APIs) over network 760, or other types of applications. Other applications 716 may also include communication applications, such as email, texting, voice, social networking, and IM applications that allow a user to send and receive emails, calls, texts, and other notifications through network 760. For example, the other application 716 may be an email or instant messaging application that receives a prediction result message from the server 730. Other applications 716 may include device interfaces and other display modules that may receive input and/or output information. For example, other applications 716 may contain software programs for asset management, executable by a processor, including a graphical user interface (GUI) configured to provide an interface to the user 740 to view a generated image.

User device 710 may further include database 718 stored in a transitory and/or non-transitory memory of user device 710, which may store various applications and data and be utilized during execution of various modules of user device 710. Database 718 may store user profile relating to the user 740, predictions previously viewed or saved by the user 740, historical data received from the server 730, and/or the like. In some embodiments, database 718 may be local to user device 710. However, in other embodiments, database 718 may be external to user device 710 and accessible by user device 710, including cloud storage systems and/or databases that are accessible over network 760.

User device 710 includes at least one network interface component 717 adapted to communicate with data vendor server 745 and/or the server 730. In various embodiments, network interface component 717 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 745 may correspond to a server that hosts database 719 to provide training datasets including a text corpus to the server 730. The database 719 may be implemented by one or more relational database, distributed databases, cloud databases, and/or the like.

The data vendor server 745 includes at least one network interface component 726 adapted to communicate with user device 710 and/or the server 730. In various embodiments, network interface component 726 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 745 may send asset information from the database 719, via the network interface 726, to the server 730.

The server 730 may be housed with the M-T2I module 630 and its submodules described in FIG. 6. In some implementations, M-T2I module 630 may receive data from database 719 at the data vendor server 745 via the network 760 to generate images. The generated image may also be sent to the user device 710 for review by the user 740 via the network 760.

The database 732 may be stored in a transitory and/or non-transitory memory of the server 730. In one implementation, the database 732 may store data obtained from the data vendor server 745. In one implementation, the database 732 may store parameters of the M-T2I module 630. In one implementation, the database 732 may store previously generated images, and the corresponding input feature vectors.

In some embodiments, database 732 may be local to the server 730. However, in other embodiments, database 732 may be external to the server 730 and accessible by the server 730, including cloud storage systems and/or databases that are accessible over network 760.

The server 730 includes at least one network interface component 733 adapted to communicate with user device 710 and/or data vendor servers 745, 770 or 780 over network 760. In various embodiments, network interface component 733 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 760 may be implemented as a single network or a combination of multiple networks. For example, in various embodiments, network 760 may include the Internet or one or more intranets, landline networks, wireless networks, and/or other appropriate types of networks. Thus, network 760 may correspond to small scale communication networks, such as a private or local area network, or a larger scale network, such as a wide area network or the Internet, accessible by the various components of system 700.

Example Work Flows

FIG. 8A provides an example pseudo-code segment 800 for a method of optimization based on the framework shown in FIGS. 1-5. FIG. 8B provides an example logic flow diagram illustrating a method of training the modularized text-to-image framework. In some stances, this method is carried out according to the pseudo-code segment 800 in FIG. 8A, according to some embodiments described herein. One or more of the processes of method 850 may be implemented, at least in part, in the form of executable code stored on non-transitory, tangible, machine-readable media that when run by one or more processors may cause the one or more processors to perform one or more of the processes. In some embodiments, method 850 corresponds to an example operation of the M-T2I module 630 (e.g., FIGS. 6-7).

As illustrated, the pseudo-code segment 800 is comprised of a number of steps. The steps of the pseudo-code segment are further described in FIGS. 1-5 and accompanying description.

As illustrated, the method 850 includes a number of enumerated steps, but aspects of the method 850 may include additional steps before, after, and in between the enumerated steps. In some aspects, one or more of the enumerated steps may be omitted or performed in a different order.

At step 852, a prompt (e.g., 110 in FIG. 1) is received, via a data interface (e.g., data interface 615 in FIG. 6, network interface 733 in FIG. 7). In some instances, the prompt may be sentence, e.g., "a cow jumping over the moon."

At step 854, a pre-trained language model (e.g., 102 in FIG. 1) may encode (e.g., by a processor 610 running an LM submodule 632) the prompt into a source embedding (e.g., 204 in FIGS. 2-3) in a source representation space. In some instances, the pre-trained language model may be T5 or XLM-Roberta.

At step 856, a target text encoder (e.g., 115 in FIG. 1) may encode (e.g. by a processor 610 running an Image Generator submodule 633) the prompt (e.g., 110 in FIG. 1) into a target embedding (e.g., 130 in FIGS. 1-3) in a target representation space. The target text encoder is the encoder originally trained with the image generator to produce a text-to-image model. In some instances, the target text encoder may be a BERT-based encoder.

At step 858, a translation network encoder (e.g., 120 in FIG. 1) transforms (e.g. by a processor 610 running an MTN submodule 631) the source embedding from the source representation space into a transformed source embedding (e.g. 125 in FIG. 1) in the target representation space. As described in FIGS. 1-5, the translation network encoder (e.g., 120 in FIG. 1) serves to "translate" between the output space of the pre-trained language model (e.g., 102 in FIG. 1) and the output space of the target text encoder (e.g., 115 in FIG. 1).

At step 860, a translation network decoder (e.g., 310 in FIG. 3) generates (e.g., by a process 610 running an MTN submodule 631) a decoded source embedding (e.g., 216 in FIGS. 2-3) in the source representation space from the transformed source embedding (e.g., 125 in FIG. 1). In some embodiments, a step is included in which a discriminator network (e.g., 320 in FIG. 3) generates a target distribution over the target representation space (i.e., over the space of the target embeddings 130) and a transformed source distribution over the target representation space (i.e., over the space of the transformed source embeddings 125).

At step 862, a first loss (e.g., 305 in FIG. 3 and Eq. 1) is computed based, at least in part, on a difference between the target embedding (e.g., 130 in FIG. 1) and the transformed source embedding (e.g., 125 in FIG. 1). In some instances, the first loss is the mean square error loss as described above and in Eq. 1.

At step 864, a second loss based is computed based, at least in part, on a difference between the source embedding (e.g., 204 in FIG. 3) and the decoded source embedding (e.g., 216 in FIG. 3). In some instances, the second loss is a reconstruction loss (e.g., 315 in FIG. 3 and Eq. 3) that serves to preserve the features recognized by the pre-trained language model (e.g., 102 in FIG. 1). In addition, the second loss may be related to closed-loop self-consistency which helps to accelerate training of the translation network. In some embodiments, a third loss (e.g., 325 in FIG. 3 and Eq. 2) may also be computed based, at least in part, on the target distribution and the transformed source distribution, as described above.

At step 866, parameters of the translation network encoder (e.g., $\Theta_M$) and the translation network decoder (e.g., $\Theta_N$) are updated (e.g., by processor 610 running the M-T2I module 630) based on the first loss (e.g., 305 in FIG. 3 and Eq. 1) and the second loss (e.g., 315 in FIG. 3 and Eq. 3) via backpropagation. In some embodiments, the parameters of the discriminator network (e.g., $\Theta_D$), translation network encoder (e.g., $\Theta_M$), and translation network decoder (e.g., $\Theta_N$) may be updated based on the first, second, and third loss (e.g., 305, 315, and 325 and Eqs. 1, 3, and 2, respectively). In some instances, the parameters of the pre-trained language model are frozen (i.e., not changed) during the update of the parameters of the translation network encoder and translation network decoder. In some instances, the parameters of the pre-trained language model are frozen during the update of the parameters of the discriminator network, the translation network encoder, and the translation network decoder.

In some embodiments, in addition to the steps above, the method may comprise an image generation step. In some instances, an image generator (e.g., 135 in FIG. 1) generates (e.g., by a processor 610 running the M-T2I module 630) an image (e.g., 155 in FIG. 1) from a transformed source embedding (e.g., 125 in FIG. 1).

In some embodiments, the image generator (e.g., 135 in FIG. 1) may be finetuned as a part of the method of integrating the per-trained language model (e.g., 102 in FIG. 1) into the existing T2I model. Finetuning the image generator comprises a number of steps described below and elsewhere in the description.

First, an image (e.g., a depiction of a cow jumping over the moon) associated with a prompt (e.g., "a cow jumping over the moon") is received via a data interface (e.g., data interface 615 in FIG. 6, network interface 733 in FIG. 7). In some instances, the image is represented as an array of pixel values.

Second, a condition source embedding is generated (e.g., by a processor 610 running an Image Generator submodule 633) by a conditioning network from the transformed source embedding (e.g., 125 in FIG. 1). In some instances, the conditioning network is denoted $c_\phi$, where $\phi$ are the parameters of the network.

Third, an image feature embedding in a latent space is generated (e.g., by a processor running the Image Generator submodule 633) by an image encoder from the image. The image encoder is applied for latent feature extraction.

Fourth, a noisy image embedding is generated (e.g., by a processor 610 running the Image Generator submodule 633) by adding gaussian noise to the image feature embedding.

Fifth, a noisy image-text embedding is generated (e.g., by a processor 610 running the Image Generator submodule 633) by concatenating the condition source embedding and the noisy image embedding.

Sixth, a noise-reduced image-text embedding is generated (e.g., by a processor 610 running the Image Generator submodule 633) by a denoising network from the noisy image-text embedding. In some instances, the denoising network includes cross-attention layers that allow the text and noisy image to interact during the process of denoising. The denoising network may have the structure of a U-net.

Seventh, a third loss (e.g., Eq. 8) is computed based, at least in part, on an unscaled gaussian noise and the noise-reduced image-text embedding.

Finally, the parameters of the denoising network and conditioning network are updated (e.g., by a processor 610 running the Image Generator submodule 633) based on third loss (e.g., Eq. 8) via backpropagation.

Example Results

FIGS. 9-18 represent exemplary test results using embodiments described herein. These embodiments will be denoted by "MTN" or "M-T2I" in the discussion that follows. The use of either term does not signify a single embodiment. Comparisons are made to LDM as described in Rombach et al., High resolution image synthesis with latent diffusion models, in CVPR, 2022; CogView as described in Ding et al., Cogview: Mastering text-to-image generation via transformers, in NeurIPS, 2021; LAFITE as described in Zhou et al., Lafite: Towards language-free training for text-to-image generation, arXiv: 2111.13792, 2021; GLIDE as described in Nichol et al., Glide: Towards photorealistic image generation and editing with text-guided diffusion models, arXiv: 2112.10741, 2021; Make-A-Scene as described in Gafni et al., Make-a-scene: Scene-based text-to-image generation with human priors, arXiv: 2203.13131, 2022.

The pre-trained language models used are Bert as described in Devlin et al., Bert: pre-training of deep bidirectional transformers for language understanding, arXiv: 1810.04805, 2018; CLIP as described in Radford et al., Learning transferable visual models from natural language supervision, in ICML, 2021; T5-L and T5-3B as described in Raffel et al., Exploring the limits of transfer learning with a unified text-to-text transformer, in Journal of Machine Learning Research, pages 1-67, 2020; XLM-Roberta as described in Conneau et al., Unsupervised cross-lingual representation learning at scale, arXiv: 1911.02116, 2019; and Roberta-L as described in Liu et al., Roberta: A robustly optimized bert pretraining approach, arXiv: 1907.11692, 2019.

Datasets used in the comparison for evaluating and/or training MTN or M-T2I include Laion-400M as described in Schuhmann et al., Laion-400m: Open dataset of clip-filtered 400 million image-text pairs, arXiv: 2111.02114, 2021; Wikimatrix as described in Schwenk et al., Wikimatrix: Mining 135M parallel sentences in 1620 language pairs from Wikipedia, arXiv: 1907.05791, 2019; googletrans as described at: https://pypi.org/project/googletrans/; Drawbench as described in Saharia et al., Photorealistic text-to-image diffusion models with deep language understanding, arXiv: 2205.11487, 2022; Winoground as described in Thrush et al., Winoground: Probing vision and language models for visio-linguistic compositionality, in CVPR, 2022; COCO as described in Lin et al., Microsoft coco: Common objects in context, in ECCV, 2014; Amazon Turk as described in Buhrmester et al., Amazon's mechanical turk: A new source of inexpensive, yet high-quality, data?, in Perspectives on Psychological Science, 2011; and Crossmodal as described in Thapliyal et al., Crossmodal-3600: A massively multilingual multimodal evaluation Dataset, arXiv: 2205.12522, 2022.

Scoring methods used in the comparison include zero-shot FID score as described in Heusel et al., GANs trained by a two time-scale update rule converge to a local nash equilibrium, in NeurIPS, 2017; and CLIP as described in Radford et al., Learning transferable visual models from natural language supervision, in ICML, 2021.

A user study was completed that asked users to evaluate image quality and text controllability. The users compared output from a baseline LDM, an M-T2I model with T5 as the LM, and an M-T2I model with T5 as the LM and a finetuned image generator. For image quality, 33.6% of users chose the baseline LDM, 32.4% chose M-T2I with T5, and 34% chose M-T2I with T5 and finetuned image generator. For text controllability, 32.7% of users chose the baseline LDM, 31.7% chose M-T2I with T5, and 35.7% chose M-T2I with T5 and image generator finetuned. For both metrics, the users preferred images from a M-T2I model with T5 as the pre-trained language model, a translation network, and fine-tuning of the image generator.

In FIGS. 9-18, LDM refers to the baseline Latent Diffusion Model, LDM* is a completely retrained baseline Latent Diffusion Model, MTN refers to the translation network, FN and FT refer to finetuning the image generator. A lower FID score indicates better performance relative to a higher score, while a higher CLIP score indicates better performance relative to a lower score.

FIG. 9 is a table describing various configurations for the translation network. Columns 4 and 5 describe configurations of the translation network where the body net's MLP-based mixer blocks comprise 3 and 5 residual modules, respectively. Each residual module has the structure as described in FIG. 5 and accompanying description.

FIG. 10 is chart describing the FID score on the COCO dataset for a number of T2I models. The chart depicts excellent performance for M-T2I with T5, MTN, and fine-tuning for the zero-shot FID score.

FIG. 11 is chart depicting the improved performance of the M-T2I model with each training objective for the model. Both the FID and CLIP scores are shown for each configuration and training is done on the COCO dataset. The classifier-free guidance parameter s, appearing in Eq. 9, is set to different values to test performance. The first row represents the direct combination of T5 and LDM. The second row is the combination of T5 and LDM but completely retrained. Rows 3-6 represent the combination of T5, translation network, and image generator with training objectives present or not as noted in the chart. Finetuning the U-net (i.e., a component of the image generator) takes approximately 100 GPU days whereas translation network training needs only 5 GPU days.

FIG. 12 is a chart describing the CLIP score for the translation network's transfer of OpenClip-L to Clip-L for Stable Diffusion. The benchmarking is done on the average CLIP score with 500 generative samples, sized 512 by 512.

Figure 13:
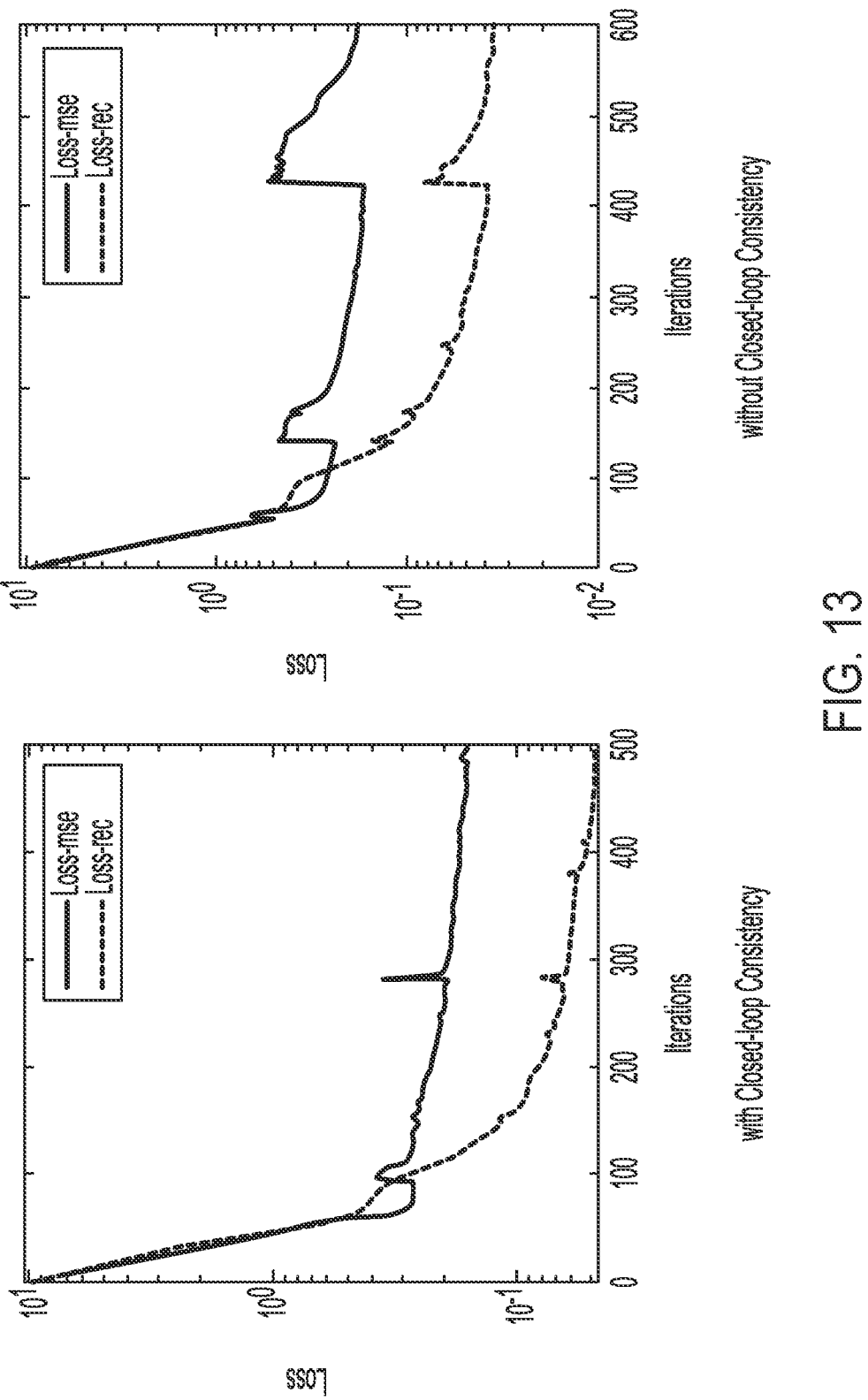

FIG. 13 is a chart depicting the benefits of enforcing closed loop consistency as described in FIGS. 2-4 and accompanying description. The vertical axis is the value of the computed loss, and the horizontal axis is the iteration number during training.

FIG. 14 is a chart depicting the performance of the M-T2I model with different pre-trained language models (e.g., Bert-B, Roberta-L, etc.) and different values of the classifier free guidance parameter, s. The scores used to compare the different pre-trained language models are the FID score and CLIP score. The chart shows how the pre-trained language model with the largest number of parameters, T5-3B, achieves strong performance. The number in parentheses next to each pre-trained language model is the number of parameters in the model.

FIG. 15 is a chart depicting performance of a M-T2I model for differing source representation space token lengths and target representation space token lengths. The number before the arrow indicates the length of tokens in the source representation space, and the number after the arrow indicates the length of tokens in the target representation space. The dataset used is COCO and the classifier free guidance parameter is set to 5. Roberta-L is used as the pre-trained language model. The chart shows performance improves for large token sizes in the source representation space (i.e., the token length of the output of the pre-trained language model). Other settings used match those of FIG. 15.

FIG. 16 is a chart depicting the performance and time-cost of training for various numbers of parameters in the translation network.

FIG. 17 is a chart depicting performance and time-cost of various configurations of M-T2I. Performance is based on the CLIP and FID scores. Time-cost is measured in GPU days. "MTN ##M" refers to a translation network with ## million parameters. The chart shows that significant performance can be achieved with greatly reduced time-cost.

FIG. 18 is a chart depicting the performance of multilingual M-T2I. Performance is based on Multilingual-CLIP score over a Crossmodal benchmark. The chart shows comparable performance between the XLM-Roberta+ MTN+SDM model (M-T2I model) and M2M100-418M model. However, the latter model requires 7.5 billion parallel sentences while the M-T2I model requires only 2 million sentences in each language of the pair, where each sentence in one language is meaning-equivalent to another sentence in the other language. In some aspects, the source language is English for aligning Stable Diffusion.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method of integrating a pre-trained language model into a text-to-image model of a target text encoder and an image generator model, the method comprising:
   receiving, via a data interface, a text prompt describing image content;
   encoding, via a pre-trained language model, the text prompt into a source embedding in a source representation space;
   encoding, via the target text encoder, the prompt into a target embedding in a target representation space;
   transforming, via a translation network encoder, the source embedding from the source representation space into a transformed source embedding in the target representation space;
   generating, via a translation network decoder, a decoded source embedding in the source representation space from the transformed source embedding;
   computing a first loss based, at least in part, on a difference between the target embedding and the transformed source embedding;
   computing a second loss based, at least in part, on a difference between the source embedding and the decoded source embedding;
   training the translation network encoder and the translation network decoder based on the first loss and the second loss; and
   building a modularized text-to-image model by replacing the target text encoder in the text-to-image model with the pre-trained language model followed by the trained translation network encoder.

2. The method of claim 1, wherein the training comprises updating the parameters of the translation network encoder and the translation network decoder via propagation through the translation network encoder, the translation network decoder, and the pre-trained language model based on the first loss and the second loss while keeping the pre-trained language model frozen.

3. The method of claim 1, further comprising:
   generating, by the image generator model, an image from the transformed source embedding.

4. The method of claim 1, further comprising:
   receiving, via a data interface, an image associated with the text prompt;
   generating, via a conditioning network, a condition source embedding from the transformed source embedding;
   generating, by an image encoder, an image feature embedding in a latent image space from the image;
   generating a noisy image embedding from the image feature embedding by adding gaussian noise to the image feature embedding;
   generating a noisy image-text embedding by concatenating the condition source embedding and the noisy image embedding;
   generating, by a denoising network, a noise-reduced image-text embedding from the noisy image-text embedding;
   computing a third loss, based at least in part, on an unscaled gaussian noise and the noise-reduced image-text embedding; and
   updating parameters of the denoising network and conditioning network based on the third loss.

5. The method of claim 4, wherein the updating comprises updating the parameters of the denoising network and the conditioning network while keeping the pre-trained language model frozen.

6. The method of claim 1, further comprising:

generating, by a discriminator network, a target distribution over the target representation space and a transformed source distribution over the target representation space from the target embedding and the transformed source embedding, respectively;

computing a third loss based, at least in part, on the target distribution and the transformed source distribution; and updating parameters of the discriminator network, the translation network encoder, and the translation network decoder based on the first loss, second loss, and third loss via backpropagation.

7. The method of claim 6, wherein the updating comprises updating the parameters of the discriminator network, the translation network encoder, and translation network decoder while keeping the pre-trained language model frozen.

8. A system for integrating a pre-trained language model into a text-to-image model of a target text encoder and an image generator model, the system comprising:

a communication interface that receives a plurality of training samples;

a memory containing machine readable medium storing machine executable code;

one or more processors coupled to the memory and configurable to execute the machine executable code to cause the one or more processors to:

receiving, via a data interface, a text prompt describing image content;

encoding, via a pre-trained language model, the text prompt into a source embedding in a source representation space;

encoding, via the target text encoder, the prompt into a target embedding in a target representation space;

transforming, via a translation network encoder, the source embedding from the source representation space into a transformed source embedding in the target representation space;

generating, via a translation network decoder, a decoded source embedding in the source representation space from the transformed source embedding;

computing a first loss based, at least in part, on a difference between the target embedding and the transformed source embedding;

computing a second loss based, at least in part, on a difference between the source embedding and the decoded source embedding;

training the translation network encoder and the translation network decoder based on the first loss and the second loss; and building a modularized text-to-image model by replacing the target text encoder in the text-to-image model with the pre-trained language model followed by the trained translation network encoder.

9. The system of claim 8, wherein the processor is further configured to train the translation network encoder and translation network decoder via propagation through the translation network encoder, the translation network decoder, and the pre-trained language model based on the first loss and the second loss while keeping the pre-trained language model frozen.

10. The system of claim 8, wherein the processor is further configured to:

generate, by the image generator model, an image from the transformed source embedding.

11. The system of claim 8, wherein the processor is further configured to:

receive, via a data interface, an image associated with the prompt;

generate, via a conditioning network, a condition source embedding from the transformed source embedding;

generate, by an image encoder, an image feature embedding in a latent image space from the image;

generate a noisy image embedding from the image feature embedding by adding gaussian noise to the image feature embedding;

generate a noisy image-text embedding by concatenating the condition source embedding and the noisy image embedding;

generate, by a denoising network, a noise-reduced image-text embedding from the noisy image-text embedding;

compute a third loss, based at least in part, on an unscaled gaussian noise and the noise-reduced image-text embedding; and update parameters of the denoising network and conditioning network based on the third loss via backpropagation.

12. The system of claim 11, wherein to update parameters, the processor is further configured to update the parameters of the denoising network and the conditioning network while keeping the pre-trained language model frozen.

13. The system of claim 8, wherein the processor is further configured to:

generate, by a discriminator network, a target distribution over the target representation space and a transformed source distribution over the target representation space from the target embedding and the transformed source embedding, respectively;

compute a third loss based, at least in part, on the target distribution and the transformed source distribution; and update parameters of the discriminator network, the translation network encoder, and the translation network decoder based on the first loss, second loss, and third loss via backpropagation.

14. The system of claim 13, wherein to update parameters, the processor is further configured to update parameters of the discriminator network, the translation network encoder, and the translation network decoder while keeping the pre-trained language model frozen.

15. A non-transitory machine-readable medium comprising a plurality of machine-executable instructions for integrating a pre-trained language model into a text-to-image model of a target text encoder and an image generator model which, when executed by one or more processors, are adapted to cause the one or more processors to perform operations comprising:

receiving, via a data interface, a text prompt describing image content;

encoding, via a pre-trained language model, the text prompt into a source embedding in a source representation space;

encoding, via the target text encoder, the prompt into a target embedding in a target representation space;

transforming, via a translation network encoder, the source embedding from the source representation space into a transformed source embedding in the target representation space;

generating, via a translation network decoder, a decoded source embedding in the source representation space from the transformed source embedding;

computing a first loss based, at least in part, on a difference between the target embedding and the transformed source embedding;

computing a second loss based, at least in part, on a difference between the source embedding and the decoded source embedding;

training the translation network encoder and the translation network decoder based on the first loss and the second loss; and building a modularized text-to-image model by replacing the target text encoder in the text-to-image model with the pre-trained language model followed by the trained translation network encoder.

16. The non-transitory machine-readable medium of claim 15, wherein the training comprises updating the parameters of the translation network encoder and the translation network decoder via propagation through the translation network encoder, the translation network decoder, and the pre-trained language model based on the first loss and the second loss while keeping the pre-trained language model frozen.

17. The non-transitory machine-readable medium of claim 15, further comprising:

generating, by the image generator model, an image from the transformed source embedding.

18. The non-transitory machine-readable medium of claim 15, further comprising:

receiving, via a data interface, an image associated with the prompt;

generating, via a conditioning network, a condition source embedding from the transformed source embedding;

generating, by an image encoder, an image feature embedding in a latent image space from the image;

generating a noisy image embedding from the image feature embedding by adding gaussian noise to the image feature embedding;

generating a noisy image-text embedding by concatenating the condition source embedding and the noisy image embedding;

generating, by a denoising network, a noise-reduced image-text embedding from the noisy image-text embedding;

computing a third loss, based at least in part, on an unscaled gaussian noise and the noise-reduced image-text embedding; and updating parameters of the denoising network and conditioning network based on the third loss via backpropagation.

19. The non-transitory machine-readable medium of claim 18, wherein the updating comprises updating the parameters of the denoising network and the conditioning network while keeping the pre-trained language model frozen.

20. The non-transitory machine-readable medium of claim 15, further comprising:

generating, by a discriminator network, a target distribution over the target representation space and a transformed source distribution over the target representation space from the target embedding and the transformed source embedding, respectively;

computing a third loss based, at least in part, on the target distribution and the transformed source distribution; and updating parameters of the discriminator network, the translation network encoder, and the translation network decoder based on the first loss, second loss, and third loss via backpropagation.

* * * * *